United States Patent [19]

Reinke et al.

[11] 4,100,387

[45] Jul. 11, 1978

[54] APPARATUS FOR THE INDUCTIVE HEATING OF WORKPIECES ESPECIALLY FOR THE HEATING OF CAM SHAFTS

[75] Inventors: Friedhelm Reinke, Remscheid; Ludwig Mackenberger, Neschen; Eckhard Siefert, Langenberg, all of Germany

[73] Assignee: AEG-Elotherm, G.m.b.H., Remscheid-Hasten, Germany

[21] Appl. No.: 713,182

[22] Filed: Aug. 10, 1976

[30] Foreign Application Priority Data

Aug. 30, 1975 [DE] Fed. Rep. of Germany ....... 2538690

[51] Int. Cl.² .............................................. H05B 5/08
[52] U.S. Cl. .............................. 219/10.57; 219/10.73; 219/10.79; 266/125; 266/129
[58] Field of Search ............... 219/10.79, 10.57, 10.43, 219/10.41, 10.67, 10.59; 266/129, 125, 124

[56] References Cited

U.S. PATENT DOCUMENTS

| 2,785,263 | 3/1957 | Van Iperen | 219/10.41 |
| 3,562,030 | 2/1971 | Seulen et al. | 219/10.73 |
| 3,659,069 | 4/1972 | Balzer | 219/10.79 |
| 3,842,234 | 10/1974 | Seyfried | 266/129 |
| 3,846,609 | 11/1974 | Enk | 219/10.43 |
| 3,944,446 | 3/1976 | Boben | 266/129 |

FOREIGN PATENT DOCUMENTS

1,036,725   7/1966   United Kingdom .............. 219/10.59

*Primary Examiner*—Bruce A. Reynolds
*Attorney, Agent, or Firm*—Cushman, Darby & Cushman

[57] ABSTRACT

An apparatus for surface hardening an irregularly shaped workpiece made of hardenable material by inductive heating whereby a clamped workpiece is rotated past a linear conductor disposed along the envelope circle formed by the cam of the workpiece which extends farthest from the workpiece axis. The conductor has a plurality of yoke sheets to heat the workpiece surface uniformly.

3 Claims, 2 Drawing Figures

APPARATUS FOR THE INDUCTIVE HEATING OF WORKPIECES ESPECIALLY FOR THE HEATING OF CAM SHAFTS

The invention relates to an apparatus for surface hardening a workpiece by inductive heating of an irregularly shaped workpiece made of a hardenable material and having eccentric portions along its longitudinal axis which extend outwardly. The apparatus includes a clamp for the workpiece, operating means for rotating of the workpiece around its longitudinal axis and an inductor disposed at a distance from the surface of the workpiece for inductive heating.

For inductive heating the surface of camshafts, e.g., for injection pumps on Diesel engines or other workpieces which are made from hardenable material, it is well known to surface harden the workpieces by heating the parts of the workpiece that are to be hardened inductively and quenching the workpiece afterwards. An alternating current flows through the inductor along the surface of the shaft that is to be hardened, which inductor is disposed at a distance from said workpiece, separated by air and enclosing at least partially the workpiece. The surface areas of the cams of the shaft are embraced by inductors of a suitably large diameter which are developed almost circularly and rotate within the encompassing inductor around the rotational axis of the shaft during inductive heating. In that way and by individual adaptation of the individual inductors to the geometrical shape of the shaft, the surface areas that are to be hardened can be heated perfectly and can be hardened correspondingly.

When bending strength is required in a workpiece, the partial hardening of the shaft, i.e., their hardening in the area of their running surfaces, is insufficient and it has been known to subject the entire surface of the shaft, e.g., by way of case hardening or nitrogen hardening, to a hardening process.

Such methods of shaft treating are time consuming. Therefore, it has been known for the processing of camshafts, e.g., made of hard chill casting, to harden only the bearing points of the shaft, respectively, the pertinent running surfaces of the cams inductively by inductive heating of the shaft material in the area of the parts that are to be hardened and by subsequent quenching. The arrangements known for this — depending on the number of cams and bearing points — have a number of variably shaped inductors, which are adapted always to the shape of the surface that is to be heated and show correspondingly complicated forms. The inductors encompass at least partially the sections of the shaft that are to be heated and they must be shaped in such a way, that the workpieces to be hardened can be brought over a recess on the periphery of the inductors into the working position.

This invention, therefore, simplifies such arrangements and improves the accessibility of the bearing points of the workpiece in the individual arrangements for their exchange or removal and insertion to change a workpiece.

According to the present invention, this task is solved in that the inductor arrangement is a linear conductor which is disposed at a distance from the rotational axis of the workpiece running in the direction of the longitudinal axis of the workpiece on the outside or on the covering cylinder surface of the workpiece which is assigned to the eccentric extension of the greatest length.

To equalize possibly occurring varying heatings of the workpiece along its longitudinal axis, the back of at least one conductor provided for the heating of the workpiece is equipped with yoke sheets of ferromagnetic material, the distance of which is varied along the longitudinal extent of the conductor for the purpose of controlling the heating on the workpiece.

The attached drawings serve for the explanation of a prefered embodiment, in which.

Figure 1:
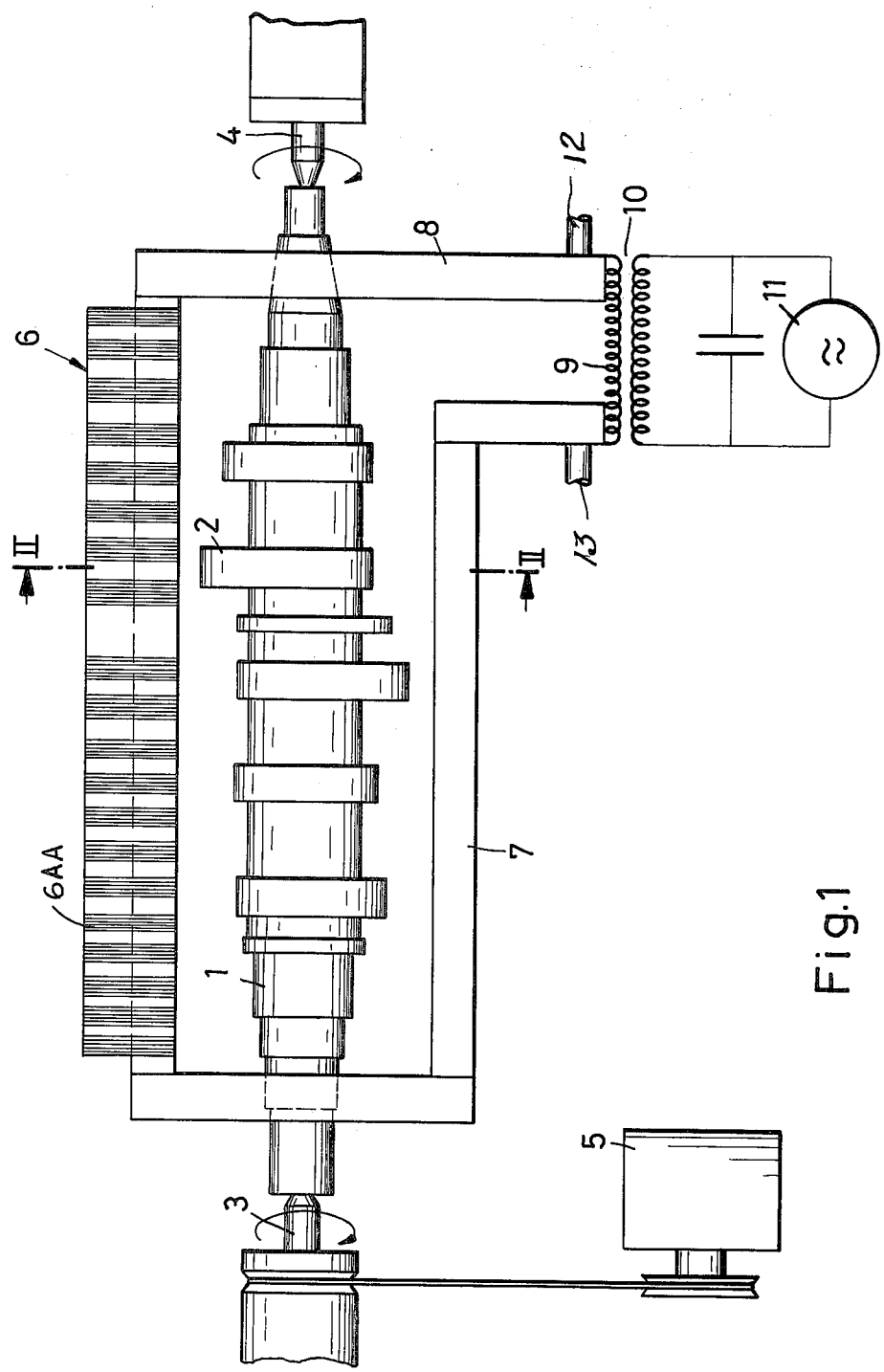
FIG. 1 is a top view of an apparatus according to the invention.

In FIG. 1, the numeral 1 designates the elongated body of a conventional steel camshaft which is provided with a fairly large number of cams, the longest one of which is cam 2. The workpiece 1 has been clamped and centered for rotation in the apparatus in a known manner by means of two clamping spindles 3 and 4. Driving motor 5 acts through an appropriate drive and clamping spindel 3 to rotate workpiece 1 around its longitudinal axis at a predeterminable speed. A linearly developed inductor 6 is disposed at a distance from the longitudinal axis of the workpiece 1, which is formed in the customary manner of a hollow copper profile and which is connected by way of corresponding conductors 7 and 8 with the secondary winding 9 of a conventional medium frequency transformer 10. The primary winding of the transformer 10 is connected with a medium frequency source of current 11.

Figure 2:
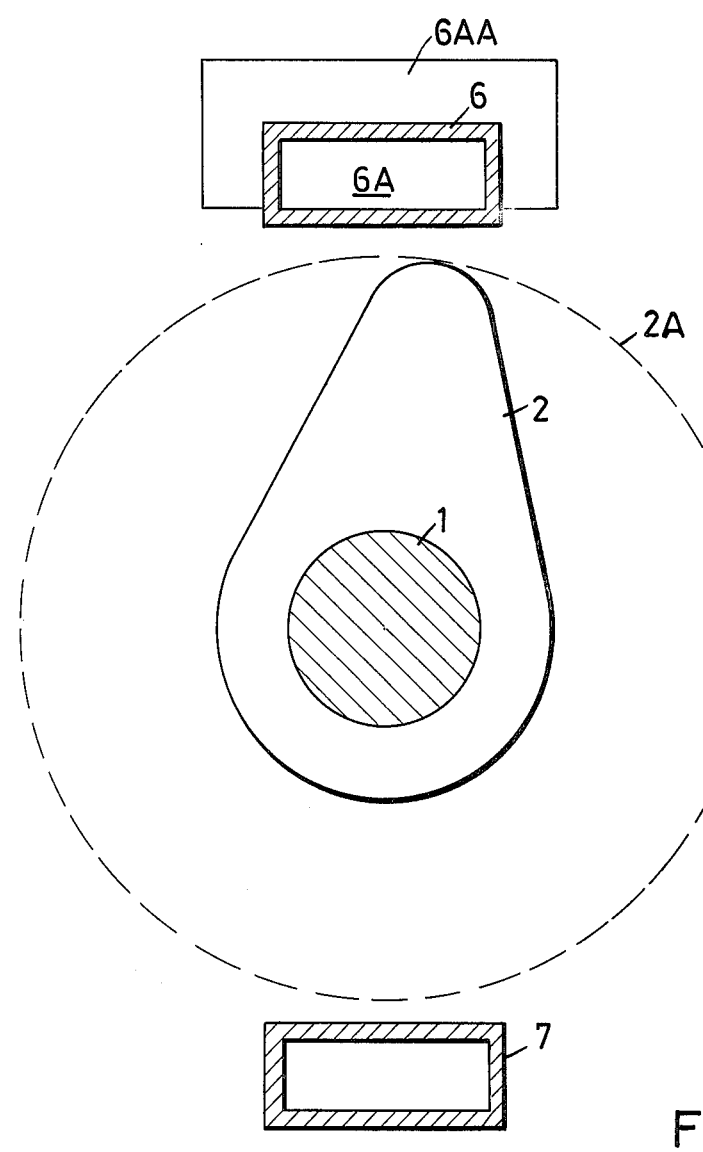
FIG. 2 shows a detail of the apparatus of FIG. 1 along the lines II—II in FIG. 1.

Referring to FIG. 2, the inside space 6A of the conductor 6 is connected by way of the receses of the connecting conductors 7 and 8 with the feeders 12 and 13, via which the inside space of the conductor 6 and the inside spaces of the pertinent connecting conductors can be supplied with a pertinent cooling water circulation for the cooling of the conductors.

The conductor 6, like the conductor 7, is disposed at a distance from the rotational axis of the workpiece 1 so that both conductors are located along the envelope circle 2A, which is formed by the cam 2 during the rotation of the shaft or at a slight distance from this envelope circle.

In order to equalize variable heatings of the workpiece 1, which result from the variable shaping of the workpiece along its longitudinal axis, the back of the inductor 6 is equipped with yoke sheets 6 AA (FIG. 2). The yoke sheets are disposed in individual groups on the back of the inductor conductor 6 and in order to influence the inducing field strength at the surface of workpiece 1, to provide a systematically varying distance which depends on the shaping of the camshaft. By suitable arrangement of these yoke sheets, variable heatings can be equalized and it is possible to heat the entire workpiece on its entire surface essentially uniformly and thus to harden it on its surface also with uniform hardening depth.

The apparatus of the invention has the advantage that the workpieces that are to be hardened or heated inductively can be clamped easily into the arrangement. Also, the pertinent inductors can be produced in a simple manner, for which purpose the position of the yoke sheets can be determined possibly empirically.

Further, the connecting conductor 7 is disposed in parallel to the inductor 6 and likewise acts as an induction element for workpiece 1. It can be effective to equip the back of this connecting conductor also with yoke sheets made of ferromagnetic material, the distance of which, for the purpose of varying the heating performance, can likewise be varied properly.

Many changes and modifications in the above-described embodiment of the invention can be carried out without departing from the scope of this invention. Accordingly, that scope is intended to be limited only by the scope of the appended claims.

What is claimed is:

1. An apparatus for inductive heating to surface harden an eccentric workpiece made of hardenable material with extensions disposed eccentrically in relation to its longitudinal axis, said heating apparatus comprising:

means for clamping said eccentric workpiece for rotation;

driving means acting upon said clamping arrangement for rotating said eccentric workpiece around its longitudinal axis; and inductor means for inductive heating said eccentric workpiece, disposed at an air distance from the surface of said eccentric workpiece, and including a linear conductor disposed at a distance from the rotational axis of said eccentric workpiece running outside in the direction of the longitudinal axis of the eccentric workpiece, at least as far from said axis as the envelope cylinder surface of the eccentric workpiece, which is assigned to the eccentric extension of the greatest length.

2. An apparatus an in claim 1, further including a plurality of yoke sheets made of ferromagnetic material and attached to the back of said linear conductor, the distance of which along the longitudinal extent of the condutor being varied for controlling the heating in said workpiece.

3. An apparatus as in claim 1, including a plurality of linearly running conductors which are disposed in parallel to one another, each distributed around the rotational axis of the workpiece, outside of the envelope cylinder surface with the greatest radius, and at an angular separation from one another.

* * * * *